Aug. 22, 1950     W. D. WILSON ET AL     2,519,806
GAS METER CASING

Filed Aug. 31, 1948     3 Sheets-Sheet 1

INVENTORS
WALTER D. WILSON &
DONALD C. E. POOLE
BY Mawhinney Mawhinney
ATTORNEYS.

Aug. 22, 1950 W. D. WILSON ET AL 2,519,806
GAS METER CASING

Filed Aug. 31, 1948 3 Sheets-Sheet 2

INVENTORS
WALTER D. WILSON &
DONALD C. E. POOLE
BY Mawhinney Mawhinney
ATTORNEYS INVENTORS
WALTER D. WILSON &
DONALD C. E. POOLE
BY Mawhinney Mawhinney
ATTORNEYS.

Patented Aug. 22, 1950

2,519,806

UNITED STATES PATENT OFFICE 2,519,806

GAS METER CASING

Walter D. Wilson and Donald C. E. Poole, Coventry, England, assignors to George Wilson Gas Meters Limited, Coventry, England Application August 31, 1948, Serial No. 47,104
In Great Britain July 4, 1946

2 Claims. (Cl. 73—274)

This invention relates to dry gas meters, our main object being to provide a simple and inexpensive construction involving relatively few separable parts.

According to the invention, a dry gas meter includes a main moulding or casting, in at least two portions to be bolted or otherwise secured to one another and jointly to provide the two main compartments (each of which is to be sub-divided by a diaphragm or the like into two measuring chambers), except that separate end plates may be used, and, above the main compartments, gas passages communicating with the outlet of the meter, and a valve plate, to be secured to the upper portion of the moulding or casting, having ports to coact both with the measuring chambers and with the said passages as necessary. The valve plate is preferably the bottom wall of a hollow chamber, formed as a moulding or casting, for the valves and meter mechanism.

Figure 1:
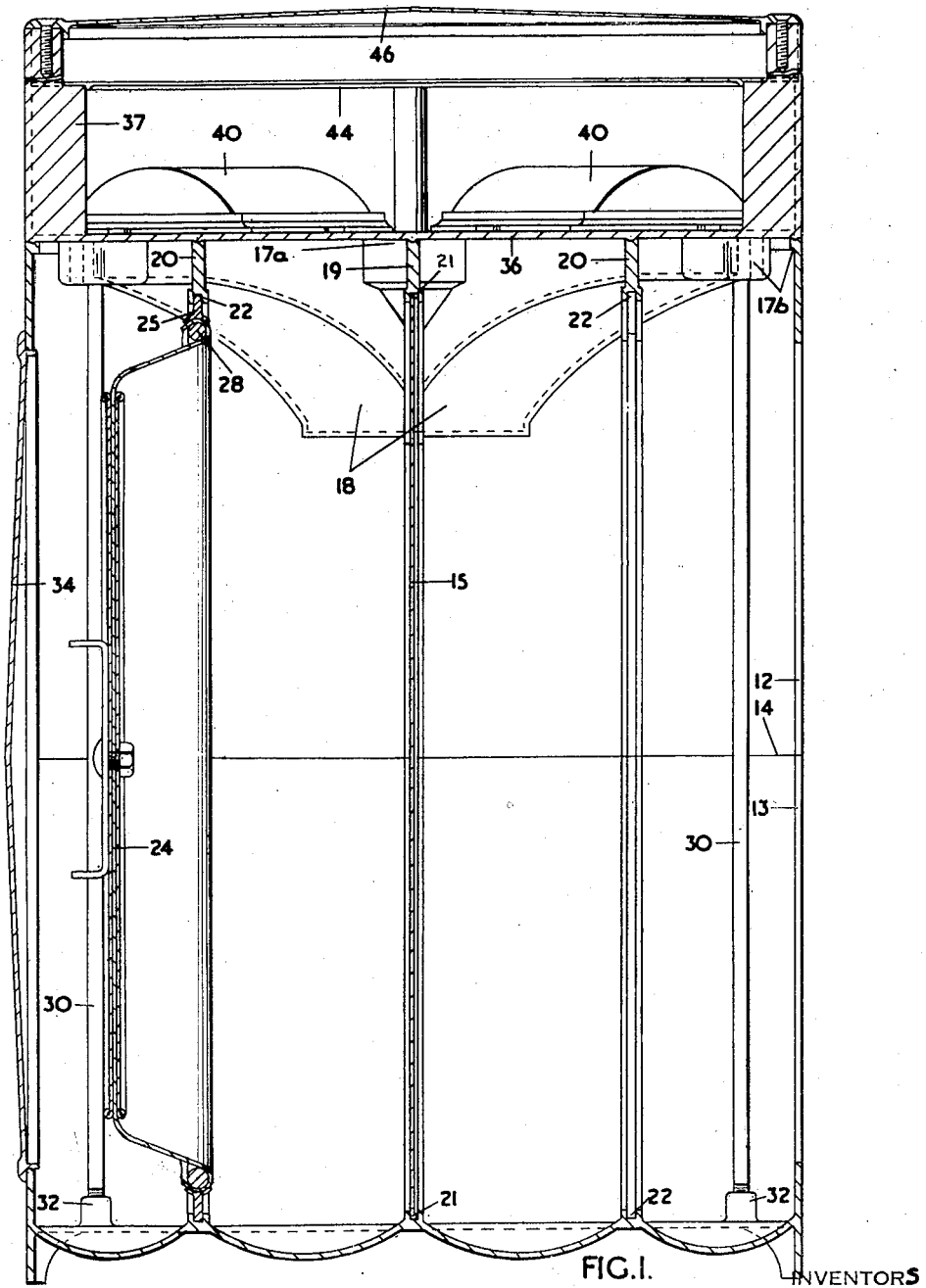
Figure 1 is a sectional elevation, taken mainly on the line 1—1 of Figure 2, of a gas meter according to the invention, but with one of the diaphragms and its supporting ring and the meter mechanism omitted.

In the construction shown there are two main portions which are die-cast (namely, an upper portion 12 and a lower portion 13) meeting along a horizontal plane 14 which extends substantially centrally of the measuring chambers. The interior of these two main portions is divided up into two main compartments by means of a vertical central partition 15. The lower edge and the vertical edges of this are rectilinear, as shown by Figure 4, except for slight bulges at the sides indicated at 16, 16— though the plate of Figure 4 is not actually an elevation of the partition 15.

The upper portion 12 has formed in it, at its upper face, an opening 17a (Figures 2 and 3) for each of the inside measuring chambers and an opening 17b for each of the outside measuring chambers. It also has formed in it the exhaust passages 18, 18 (Figures 2 and 3) which are integral with transverse webs 19 and 20, 20, and which have openings 18a at the upper face. The central web 19 has its edge shaped according to the adjacent contour of the adjacent portion of the outlet passages 18, and in consequence the upper edge of the partition 15 is cut away, as indicated at 21 in Figure 4 (only more so than there shown as the outlet passage is deeper), in order to mate therewith. The web 19 is grooved at its edge, as shown at 21 in Figure 1, and the rest of the upper and lower portions 12, 13 are internally grooved in the same plane, also as shown at 21, the groove extending completely round the meter in order to receive the edges of the partition 15. In a similar way, each of the webs 20, and the rest of the upper and lower portions 12, 13, are grooved, as shown at 22, 22, to receive the diaphragms.

Figure 4:
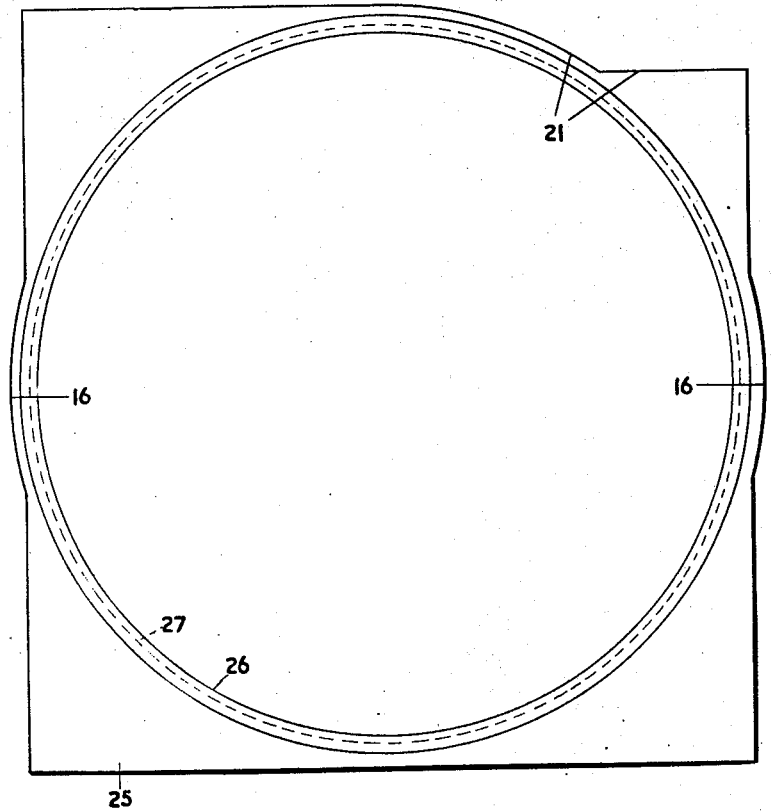
Figure 4 is an elevation, also to the smaller scale, of one of the diaphragm supporting rings, the subject of Patent Application No. 34,381/45.

Instead of mounting the diaphragms (of which only one, 24, appears in Figure 1) directly against the lower edges of the webs 20, we prefer to support each of them from a plate such as is shown at 25 in Figure 1 and in Figure 4, the plate having an opening 26 (shown as circular in this case) and an external periphery shaped as shown, the corner 21 being cut away to accommodate the outlet passages 18. The plate 25 has a groove 27 at its internal periphery into which fits the edge of the flexible portion of the diaphragm retained therein by an outwardly-springing ring 28.

Figure 2:
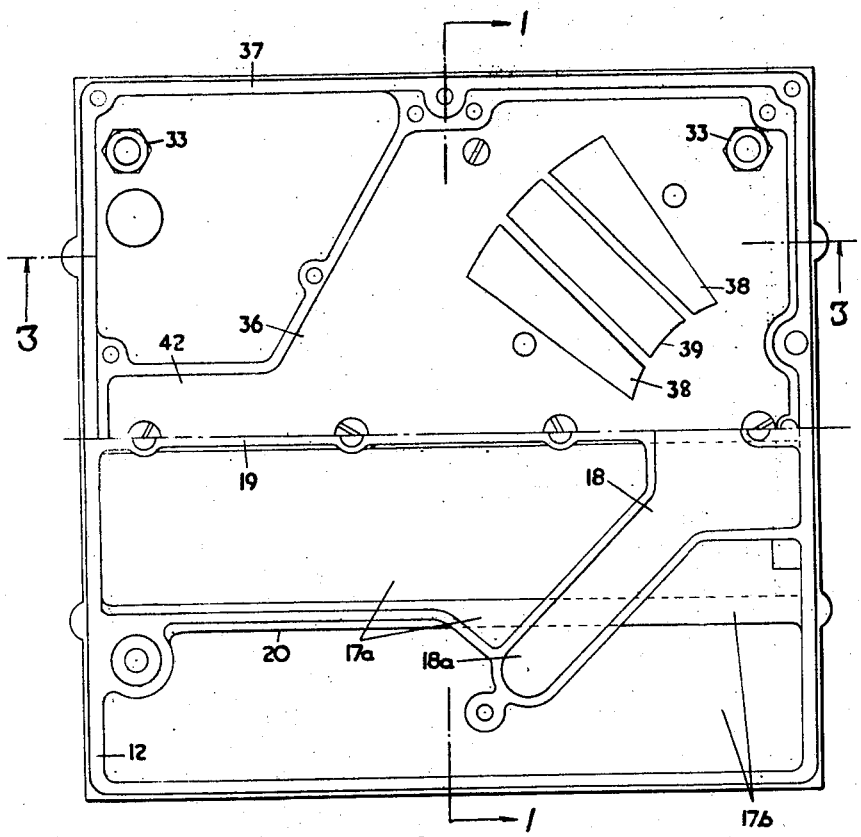
Figure 2 is a plan to a slightly smaller scale, of which the upper half has the top cover, top partition plates, valve covers and meter mechanism omitted; while the lower half is of the upper portion of the main casting.
Figure 3:
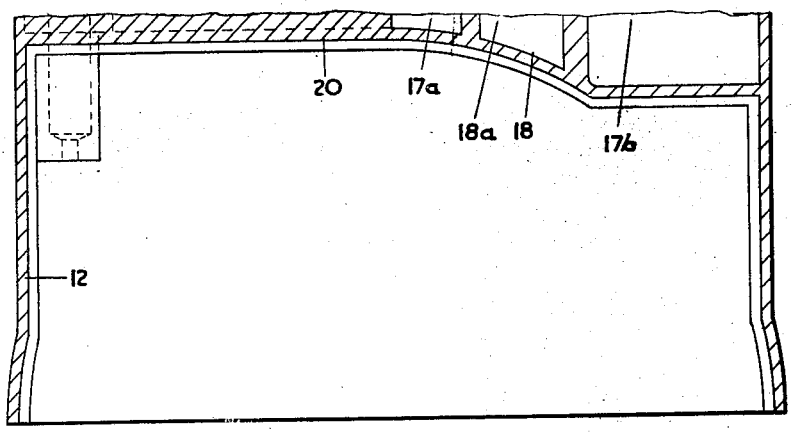
Figure 3 is a cross-section, also to the smaller scale, through the upper portion of the main casting, the section being taken mainly on the line 3—3 of Figure 2.

When the partition 15 and the plates 25 have been secured in position, with an appropriate jointing material applied as necessary, the parts are bolted to one another. Two such bolts 30 are shown in Figure 1, their lower ends being screwed into bosses 32 and their upper ends receiving washers and nuts 33 (Figure 2). After the diaphragms have been fitted the opposite sides of the casing are closed by detachable plates 34, only one being shown in Figure 1.

The upper face of the upper casting portion 12 is covered over by a valve plate 36 on which the nuts 33 bear, the valve plate being the bottom wall of a hollow chamber 37, which is also formed as a die-casting. This has in it, for each pair of measuring chambers, inlet ports 38, 38 coacting with the openings 17a, 17b, and an outlet port 39 coacting with the outlet opening 18a. Each group of three ports is controlled by a movable valve cover 40 which is adapted to be driven by the diaphragms in a usual manner. That is to say, in one position of each valve cover, gas entering (from the left in Figure 2) along the inlet passage 42 passes through one of the inlet ports 38 into the associated measuring chamber while the other inlet port, associated with the other measuring chamber, is being connected to the outlet port 39 by means of the valve cover. The inlet passage 42, and also the chamber in which the valve covers 40 are mounted, are covered by two plates one of which is shown at 44 in Figure 1, the two plates meeting along the line 1—1 in Figure 2—from which latter figure they are omitted.

The rest of the meter mechanism, not shown, arranged within the hollow chamber 37, is covered over by a top plate 46.

What we claim as our invention and desire to secure by Letters Patent of the United States is:

1. A dry gas meter having a casing and body comprising two complementary portions adapted jointly to provide two main compartments on opposite sides of a central vertical partition, the upper of said portions providing approximately the upper half of each of said main compartments and the lower of said portions providing the remainder of said main compartments, a separable central vertical partition, means carried by both said upper and lower portions for drawing the same into a gas sealed relationship, the upper of said portions above said main compartments having a wall provided with openings therethrough communicating with said main compartments, said wall also providing gas passages in its upper surfaces to communicate with the outlet of the meter, said upper and lower portions being provided with internal grooves for receiving and retaining said central partition, diaphragms supporting plates held in position by said upper and lower portions provided with diaphragms to divide each of said main compartments into two measuring chambers, and a valve plate securing on the upper of said portions and having ports therethrough to co-act both with the holes communicating with the measuring chambers and said passages.

2. A dry gas meter as claimed in claim 1 in which three sets of annular grooves are provided in said upper and lower portions, one of which secures the central vertical partition in place while the other two are disposed, one on each side of said central vertical partition for supporting said diaphragms supporting plates.

WALTER D. WILSON.
DONALD C. E. POOLE.

REFERENCES CITED

The following references are of record in the file of this patent:

UNITED STATES PATENTS

| Number | Name | Date |
|---|---|---|
| 477,910 | Milsted | June 28, 1892 |
| 1,283,025 | Armstrong | Oct. 29, 1918 |
| 1,862,451 | Armstrong | June 7, 1932 |
| 1,893,601 | Sprague | Jan. 10, 1933 |

FOREIGN PATENTS

| Number | Country | Date |
|---|---|---|
| 575,981 | Great Britain | Mar. 13, 1946 |
| 575,982 | Great Britain | Mar. 13, 1946 |